(12) United States Patent
Naik

(10) Patent No.: US 9,721,563 B2
(45) Date of Patent: *Aug. 1, 2017

(54) NAME RECOGNITION SYSTEM

(75) Inventor: Devang K. Naik, San Jose, CA (US)

(73) Assignee: Apple Inc., Cupertino, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/492,720

(22) Filed: Jun. 8, 2012

(65) Prior Publication Data

US 2013/0332164 A1  Dec. 12, 2013

(51) Int. Cl.
| | |
|---|---|
| G10L 15/00 | (2013.01) |
| G10L 15/04 | (2013.01) |
| G10L 15/26 | (2006.01) |
| G10L 15/06 | (2013.01) |
| G10L 15/18 | (2013.01) |
| G10L 21/00 | (2013.01) |
| G10L 25/00 | (2013.01) |
| G06F 17/27 | (2006.01) |
| G06F 17/21 | (2006.01) |
| G10L 15/187 | (2013.01) |

(Continued)

(52) U.S. Cl.
CPC ............ *G10L 15/187* (2013.01); *G10L 15/30* (2013.01); *G10L 2015/025* (2013.01); *G10L 2015/0633* (2013.01)

(58) Field of Classification Search
CPC ..... G10L 15/187; G10L 15/063; G10L 15/22; G10L 15/265; G06F 17/30746; G06F 17/2775; G06F 17/2795
See application file for complete search history.

(56) References Cited

U.S. PATENT DOCUMENTS

| | | | |
|---|---|---|---|
| 3,704,345 A | 11/1972 | Coker et al. | |
| 3,828,132 A | 8/1974 | Flanagan et al. | |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

(Continued)

*Primary Examiner* — Richemond Dorvil
*Assistant Examiner* — Thuykhanh Le
(74) *Attorney, Agent, or Firm* — Morrison & Foerster LLP

(57) ABSTRACT

A speech recognition system uses, in one embodiment, an extended phonetic dictionary that is obtained by processing words in a user's set of databases, such as a user's contacts database, with a set of pronunciation guessers. The speech recognition system can use a conventional phonetic dictionary and the extended phonetic dictionary to recognize speech inputs that are user requests to use the contacts database, for example, to make a phone call, etc. The extended phonetic dictionary can be updated in response to changes in the contacts database, and the set of pronunciation guessers can include pronunciation guessers for a plurality of locales, each locale having its own pronunciation guesser.

20 Claims, 8 Drawing Sheets

(51) Int. Cl.
G10L 15/30 (2013.01)
G10L 15/02 (2006.01)

(56) References Cited

U.S. PATENT DOCUMENTS

| | | | |
|---|---|---|---|
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,175,803 A | 12/1992 | Yeh |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda | |
| 5,293,452 A | 3/1994 | Picone et al. | |
| 5,297,170 A | 3/1994 | Eyuboglu et al. | |
| 5,301,109 A | 4/1994 | Landauer et al. | |
| 5,303,406 A | 4/1994 | Hansen et al. | |
| 5,309,359 A | 5/1994 | Katz et al. | |
| 5,317,507 A | 5/1994 | Gallant | |
| 5,317,647 A | 5/1994 | Pagallo | |
| 5,325,297 A | 6/1994 | Bird et al. | |
| 5,325,298 A | 6/1994 | Gallant | |
| 5,327,498 A | 7/1994 | Hamon | |
| 5,333,236 A | 7/1994 | Bahl et al. | |
| 5,333,275 A | 7/1994 | Wheatley et al. | |
| 5,345,536 A | 9/1994 | Hoshimi et al. | |
| 5,349,645 A | 9/1994 | Zhao | |
| 5,353,377 A | 10/1994 | Kuroda et al. | |
| 5,377,301 A | 12/1994 | Rosenberg et al. | |
| 5,384,892 A | 1/1995 | Strong | |
| 5,384,893 A * | 1/1995 | Hutchins | G10L 13/10 |
| | | | 704/258 |
| 5,386,494 A | 1/1995 | White | |
| 5,386,556 A | 1/1995 | Hedin et al. | |
| 5,390,279 A | 2/1995 | Strong | |
| 5,396,625 A | 3/1995 | Parkes | |
| 5,400,434 A | 3/1995 | Pearson | |
| 5,404,295 A | 4/1995 | Katz et al. | |
| 5,412,756 A | 5/1995 | Bauman et al. | |
| 5,412,804 A | 5/1995 | Krishna | |
| 5,412,806 A | 5/1995 | Du et al. | |
| 5,418,951 A | 5/1995 | Damashek | |
| 5,424,947 A | 6/1995 | Nagao et al. | |
| 5,434,777 A | 7/1995 | Luciw | |
| 5,444,823 A | 8/1995 | Nguyen | |
| 5,455,888 A | 10/1995 | Iyengar et al. | |
| 5,469,529 A | 11/1995 | Bimbot et al. | |
| 5,471,611 A | 11/1995 | McGregor | |
| 5,475,587 A | 12/1995 | Anick et al. | |
| 5,479,488 A | 12/1995 | Lennig et al. | |
| 5,491,772 A | 2/1996 | Hardwick et al. | |
| 5,493,677 A | 2/1996 | Balogh | |
| 5,495,604 A | 2/1996 | Harding et al. | |
| 5,502,790 A | 3/1996 | Yi | |
| 5,502,791 A | 3/1996 | Nishimura et al. | |
| 5,515,475 A | 5/1996 | Gupta et al. | |
| 5,536,902 A | 7/1996 | Serra et al. | |
| 5,537,618 A | 7/1996 | Boulton et al. | |
| 5,574,823 A | 11/1996 | Hassanein et al. | |
| 5,577,241 A | 11/1996 | Spencer | |
| 5,578,808 A | 11/1996 | Taylor | |
| 5,579,436 A | 11/1996 | Chou et al. | |
| 5,581,655 A | 12/1996 | Cohen et al. | |
| 5,584,024 A | 12/1996 | Shwartz | |
| 5,596,676 A | 1/1997 | Swaminathan et al. | |
| 5,596,994 A | 1/1997 | Bro | |
| 5,608,624 A | 3/1997 | Luciw | |
| 5,613,036 A | 3/1997 | Strong | |
| 5,617,507 A | 4/1997 | Lee et al. | |
| 5,619,694 A | 4/1997 | Shimazu | |
| 5,621,859 A | 4/1997 | Schwartz et al. | |
| 5,621,903 A | 4/1997 | Luciw et al. | |
| 5,642,464 A | 6/1997 | Yue et al. | |
| 5,642,519 A | 6/1997 | Martin | |
| 5,644,727 A | 7/1997 | Atkins | |
| 5,664,055 A | 9/1997 | Kroon | |
| 5,675,819 A | 10/1997 | Schuetze | |
| 5,682,539 A | 10/1997 | Conrad et al. | |
| 5,687,077 A | 11/1997 | Gough, Jr. | |
| 5,696,962 A | 12/1997 | Kupiec | |
| 5,701,400 A | 12/1997 | Amado | |
| 5,706,442 A | 1/1998 | Anderson et al. | |
| 5,710,886 A | 1/1998 | Christensen et al. | |
| 5,712,957 A | 1/1998 | Waibel et al. | |
| 5,715,468 A | 2/1998 | Budzinski | |
| 5,721,827 A | 2/1998 | Logan et al. | |
| 5,727,950 A | 3/1998 | Cook et al. | |
| 5,729,694 A | 3/1998 | Holzrichter et al. | |
| 5,732,390 A | 3/1998 | Katayanagi et al. | |
| 5,734,791 A | 3/1998 | Acero et al. | |
| 5,737,734 A | 4/1998 | Schultz | |

(56) References Cited

U.S. PATENT DOCUMENTS

| | | |
|---|---|---|
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,272,464 B1 * | 8/2001 | Kiraz .................... G10L 15/187 704/231 |
| 6,275,824 B1 | 8/2001 | O'Flaherty et al. |
| 6,285,786 B1 | 9/2001 | Seni et al. |
| 6,304,844 B1 | 10/2001 | Pan et al. |
| 6,308,149 B1 * | 10/2001 | Gaussier .............. G06F 17/2755 704/9 |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Quilici et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |

(56) References Cited

U.S. PATENT DOCUMENTS

| | | |
|---|---|---|
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Wolf et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 * | 12/2008 | Gillick .................. G10L 15/26 704/235 |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,630,900 B1 * | 12/2009 | Strom .......................... 704/270 |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 * | 5/2010 | Gavalda ............ G06F 17/30684 704/245 |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |

(56) References Cited

U.S. PATENT DOCUMENTS

| | | | |
|---|---|---|---|
| 7,840,447 B2 | 11/2010 | Kleinrock et al. | |
| 7,853,574 B2 | 12/2010 | Kraenzel et al. | |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |
| 7,949,529 B2 | 5/2011 | Weider et al. | |
| 7,949,534 B2 | 5/2011 | Davis et al. | |
| 7,974,844 B2 | 7/2011 | Sumita | |
| 7,974,972 B2 | 7/2011 | Cao | |
| 7,983,915 B2 | 7/2011 | Knight et al. | |
| 7,983,917 B2 | 7/2011 | Kennewick et al. | |
| 7,983,997 B2 | 7/2011 | Allen et al. | |
| 7,986,431 B2 | 7/2011 | Emori et al. | |
| 7,987,151 B2 | 7/2011 | Schott et al. | |
| 7,996,228 B2 | 8/2011 | Miller et al. | |
| 8,000,453 B2 | 8/2011 | Cooper et al. | |
| 8,005,679 B2 | 8/2011 | Jordan et al. | |
| 8,015,006 B2 | 9/2011 | Kennewick et al. | |
| 8,024,195 B2 | 9/2011 | Mozer et al. | |
| 8,036,901 B2 | 10/2011 | Mozer | |
| 8,041,570 B2 | 10/2011 | Mirkovic et al. | |
| 8,041,611 B2 | 10/2011 | Kleinrock et al. | |
| 8,055,708 B2 | 11/2011 | Chitsaz et al. | |
| 8,065,155 B1 | 11/2011 | Gazdzinski | |
| 8,065,156 B2 | 11/2011 | Gazdzinski | |
| 8,069,046 B2 | 11/2011 | Kennewick et al. | |
| 8,073,681 B2 | 12/2011 | Baldwin et al. | |
| 8,078,473 B1 | 12/2011 | Gazdzinski | |
| 8,082,153 B2 | 12/2011 | Coffman et al. | |
| 8,095,364 B2 | 1/2012 | Longé et al. | |
| 8,099,289 B2 | 1/2012 | Mozer et al. | |
| 8,107,401 B2 | 1/2012 | John et al. | |
| 8,112,275 B2 | 2/2012 | Kennewick et al. | |
| 8,112,280 B2 | 2/2012 | Lu | |
| 8,117,037 B2 | 2/2012 | Gazdzinski | |
| 8,131,557 B2 | 3/2012 | Davis et al. | |
| 8,140,335 B2 | 3/2012 | Kennewick et al. | |
| 8,165,886 B1 | 4/2012 | Gagnon et al. | |
| 8,166,019 B1 | 4/2012 | Lee et al. | |
| 8,190,359 B2 | 5/2012 | Bourne | |
| 8,195,467 B2 | 6/2012 | Mozer et al. | |
| 8,204,238 B2 | 6/2012 | Mozer | |
| 8,205,788 B1 | 6/2012 | Gazdzinski et al. | |
| 8,219,407 B1 | 7/2012 | Roy et al. | |
| 8,275,621 B2* | 9/2012 | Alewine et al. | 704/260 |
| 8,285,546 B2* | 10/2012 | Reich | 704/257 |
| 8,285,551 B2 | 10/2012 | Gazdzinski | |
| 8,285,553 B2 | 10/2012 | Gazdzinski | |
| 8,290,778 B2 | 10/2012 | Gazdzinski | |
| 8,290,781 B2 | 10/2012 | Gazdzinski | |
| 8,296,146 B2 | 10/2012 | Gazdzinski | |
| 8,296,153 B2 | 10/2012 | Gazdzinski | |
| 8,301,456 B2 | 10/2012 | Gazdzinski | |
| 8,311,834 B1 | 11/2012 | Gazdzinski | |
| 8,370,158 B2 | 2/2013 | Gazdzinski | |
| 8,371,503 B2 | 2/2013 | Gazdzinski | |
| 8,374,871 B2 | 2/2013 | Ehsani et al. | |
| 8,447,612 B2 | 5/2013 | Gazdzinski | |
| 8,521,513 B2* | 8/2013 | Millett et al. | 704/9 |
| 8,595,004 B2* | 11/2013 | Koshinaka | 704/236 |
| 8,687,777 B1* | 4/2014 | Lavian | H04M 3/493 379/88.18 |
| 2001/0047264 A1 | 11/2001 | Roundtree | |
| 2002/0032564 A1 | 3/2002 | Ehsani et al. | |
| 2002/0046025 A1 | 4/2002 | Hain | |
| 2002/0069063 A1 | 6/2002 | Buchner et al. | |
| 2002/0077817 A1 | 6/2002 | Atal | |
| 2002/0103641 A1 | 8/2002 | Kuo et al. | |
| 2002/0164000 A1 | 11/2002 | Cohen et al. | |
| 2002/0198714 A1 | 12/2002 | Zhou | |
| 2004/0049388 A1* | 3/2004 | Roth | G10L 15/19 704/251 |
| 2004/0135701 A1 | 7/2004 | Yasuda et al. | |
| 2004/0153306 A1* | 8/2004 | Tanner | G06F 17/273 704/4 |
| 2004/0210438 A1* | 10/2004 | Gillick | G10L 15/005 704/254 |
| 2004/0215449 A1* | 10/2004 | Roy | G10L 15/1822 704/211 |
| 2004/0236778 A1 | 11/2004 | Junqua et al. | |
| 2005/0055403 A1 | 3/2005 | Brittan | |
| 2005/0071332 A1 | 3/2005 | Ortega et al. | |
| 2005/0080625 A1 | 4/2005 | Bennett et al. | |
| 2005/0091118 A1 | 4/2005 | Fano | |
| 2005/0102614 A1 | 5/2005 | Brockett et al. | |
| 2005/0108001 A1 | 5/2005 | Aarskog | |
| 2005/0114124 A1 | 5/2005 | Liu et al. | |
| 2005/0119897 A1 | 6/2005 | Bennett et al. | |
| 2005/0143972 A1 | 6/2005 | Gopalakrishnan et al. | |
| 2005/0159957 A1* | 7/2005 | Roth | G10L 15/22 704/276 |
| 2005/0165607 A1 | 7/2005 | DiFabbrizio et al. | |
| 2005/0182629 A1 | 8/2005 | Coorman et al. | |
| 2005/0196733 A1 | 9/2005 | Budra et al. | |
| 2005/0273337 A1* | 12/2005 | Erell | G10L 15/07 704/260 |
| 2005/0288936 A1 | 12/2005 | Busayapongchai et al. | |
| 2006/0018492 A1 | 1/2006 | Chiu et al. | |
| 2006/0074898 A1 | 4/2006 | Gavalda et al. | |
| 2006/0106592 A1 | 5/2006 | Brockett et al. | |
| 2006/0106594 A1 | 5/2006 | Brockett et al. | |
| 2006/0106595 A1 | 5/2006 | Brockett et al. | |
| 2006/0117002 A1 | 6/2006 | Swen | |
| 2006/0122834 A1 | 6/2006 | Bennett | |
| 2006/0143007 A1 | 6/2006 | Koh et al. | |
| 2006/0173683 A1* | 8/2006 | Roth | G10L 15/183 704/251 |
| 2007/0055529 A1 | 3/2007 | Kanevsky et al. | |
| 2007/0058832 A1 | 3/2007 | Hug et al. | |
| 2007/0088556 A1 | 4/2007 | Andrew | |
| 2007/0100790 A1 | 5/2007 | Cheyer et al. | |
| 2007/0106674 A1 | 5/2007 | Agrawal et al. | |
| 2007/0118377 A1 | 5/2007 | Badino et al. | |
| 2007/0135949 A1 | 6/2007 | Snover et al. | |
| 2007/0174188 A1 | 7/2007 | Fish | |
| 2007/0185917 A1 | 8/2007 | Prahlad et al. | |
| 2007/0198267 A1* | 8/2007 | Jones | H04M 3/4936 704/257 |
| 2007/0282595 A1 | 12/2007 | Tunning et al. | |
| 2008/0015864 A1 | 1/2008 | Ross et al. | |
| 2008/0021708 A1 | 1/2008 | Bennett et al. | |
| 2008/0034032 A1 | 2/2008 | Healey et al. | |
| 2008/0052063 A1 | 2/2008 | Bennett et al. | |
| 2008/0120112 A1 | 5/2008 | Jordan et al. | |
| 2008/0129520 A1 | 6/2008 | Lee | |
| 2008/0140657 A1 | 6/2008 | Azvine et al. | |
| 2008/0154603 A1* | 6/2008 | Oddo | H04L 29/12594 704/251 |
| 2008/0221903 A1 | 9/2008 | Kanevsky et al. | |
| 2008/0228496 A1 | 9/2008 | Yu et al. | |
| 2008/0247519 A1 | 10/2008 | Abella et al. | |
| 2008/0249770 A1 | 10/2008 | Kim et al. | |
| 2008/0270138 A1 | 10/2008 | Knight et al. | |
| 2008/0270344 A1* | 10/2008 | Yurick | G06F 17/30026 |
| 2008/0273672 A1* | 11/2008 | Didcock | G10L 15/19 379/88.01 |
| 2008/0300878 A1 | 12/2008 | Bennett | |
| 2008/0319763 A1 | 12/2008 | Di Fabbrizio et al. | |
| 2009/0006100 A1 | 1/2009 | Badger et al. | |
| 2009/0006343 A1 | 1/2009 | Platt et al. | |
| 2009/0030800 A1 | 1/2009 | Grois | |
| 2009/0055179 A1 | 2/2009 | Cho et al. | |
| 2009/0058823 A1 | 3/2009 | Kocienda | |
| 2009/0076796 A1 | 3/2009 | Daraselia | |
| 2009/0077165 A1 | 3/2009 | Rhodes et al. | |
| 2009/0100049 A1 | 4/2009 | Cao | |

(56) References Cited

U.S. PATENT DOCUMENTS

| | | |
|---|---|---|
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0305203 A1* | 12/2009 | Okumura ............... G09B 5/06 434/185 |
| 2009/0307162 A1 | 12/2009 | Bui et al. |
| 2009/0307584 A1 | 12/2009 | Davidson et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0179991 A1* | 7/2010 | Lorch ............... H04M 1/7253 709/206 |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0054894 A1 | 3/2011 | Phillips et al. |
| 2011/0060807 A1 | 3/2011 | Martin et al. |
| 2011/0082688 A1 | 4/2011 | Kim et al. |
| 2011/0093261 A1 | 4/2011 | Angott |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0119051 A1* | 5/2011 | Li ............... G10L 15/065 704/10 |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131038 A1* | 6/2011 | Oyaizu ............... G10L 15/06 704/10 |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0153329 A1* | 6/2011 | Moorer ............... G06Q 30/02 704/254 |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0080177 A1 | 3/2013 | Chen |
| 2013/0110518 A1 | 5/2013 | Gruber et al. |
| 2013/0110520 A1 | 5/2013 | Cheyer et al. |
| 2013/0231917 A1* | 9/2013 | Naik ............... G10L 13/086 704/9 |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 1291848 A2 | 3/2003 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Bussler, C., et al., "Web Service Execution Environment (WSMX)," Jun. 3, 2005, W3C Member Submission, http://www.w3.org/Submission/WSMX, 29 pages.

Cheyer, A., "About Adam Cheyer," Sep. 17, 2012, http://www.adam.cheyer.com/about.html, 2 pages.

(56) References Cited

OTHER PUBLICATIONS

Cheyer, A., "A Perspective on AI & Agent Technologies for SCM," VerticalNet, 2001 presentation, 22 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Roddy, D., et al., "Communication and Collaboration in a Landscape of B2B eMarketplaces," VerticalNet Solutions, white paper, Jun. 15, 2000, 23 pages.

Acero, A., et al., "Environmental Robustness in Automatic Speech Recognition," International Conference on Acoustics, Speech, and Signal Processing (ICASSP'90), Apr. 3-6, 1990, 4 pages.

Acero, A., et al., "Robust Speech Recognition by Normalization of The Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.BerkeleyEDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages.

Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.

Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.

Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris- France, Jul. 1993, 11 pages.

Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 9-12, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.

Bellegarda, J. R., "Exploiting Latent Semantic Information in Statistical Language Modeling," In Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

Bellegarda, J. R., "Large Vocabulary Speech Recognition with Multispan Statistical Language Models," IEEE Transactions on Speech and Audio Processing, vol. 8, No. 1, Jan. 2000, 9 pages.

Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., Ed, Directions and Challenges, 15th Annual Technical Symposium, Jun. 17, 1976, Gaithersbury, Maryland, 7 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of A Personalized Information Grazing Service," INFOCOM'90, Ninth Annual Joint Conference of the IEEE Computer and Communication Societies, Jun. 3-7 1990, http://slrohall.com/publications/, 8 pages.

(56) References Cited

OTHER PUBLICATIONS

Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 534304, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

(56) References Cited

OTHER PUBLICATIONS

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.

Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.

Tenenbaum, A.M., et al., "Data Structure Using Pascal," 1981 Prentice-Hall, Inc., 34 pages.

Tsai, W.H., et al., "Attributed Grammar-A Tool for Combining Syntactic and Statistical Approaches to Pattern Recognition," IEEE Transactions on Systems, Man, and Cybernetics, vol. SMC-10, No. 12, Dec. 1980, 13 pages.

Udell, J., "Computer Telephony," BYTE, vol. 19, No. 7, Jul. 1, 1994, 9 pages.

Van Santen, J. P. H., "Contextual Effects on Vowel Duration," Journal Speech Communication, vol. 11, No. 6, Dec. 1992, 34 pages.

Vepa, J., et al., "New Objective Distance Measures for Spectral Discontinuities in Concatenative Speech Synthesis," In Proceedings of the IEEE 2002 Workshop on Speech Synthesis, 4 pages.

Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.

Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.

Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.

(56) References Cited

OTHER PUBLICATIONS

Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask For," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Elio, R. et al., "On Abstract Task Models and Conversation Policies," http://webdocs.cs.ualberta.ca/~ree/publications/papers2/ATS.AA99.pdf, May 1999, 10 pages.
Ericsson, S. et al., "Software illustrating a unified approach to multimodality and multilinguality in the in-home domain," Dec. 22, 2006, Talk and Look: Tools for Ambient Linguistic Knowledge, http://vvww.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

(56) References Cited

OTHER PUBLICATIONS

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://vvww.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

(56) References Cited

OTHER PUBLICATIONS

Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Phoenix Solutions, Inc. v. West Interactive Corp., Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.idc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube,"Send Text, Listen to and Send E-Mail 'by Voice' www.voiceassist.com," 2:11 minute video uploaded to YouTube by VoiceAssist on Jul 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/20861, which corresponds to U.S. Appl. No. 12/987,982, 15 pages (Thomas Robert Gruber).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in The Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.

(56) References Cited

OTHER PUBLICATIONS

Bulyko, I. et al., "Error-Correction Detection and Response Generation in a Spoken Dialogue System," © 2004 Elsevier B.V., specom.2004.09.009, 18 pages.
Burke, R., et al., "Question Answering from Frequently Asked Question Files," 1997, Al Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., "A Perspective on AI & Agent Technologies for SCM," VerticalNet, 2001 presentation, 22 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.

(56) References Cited

OTHER PUBLICATIONS

Hendrix, G., "Natural-Language Interface," Apr.-Jun. 1982, American Journal of Computational Linguistics, vol. 8, No. 2, 7 pages. Best Copy Available.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Kats, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages. Best Copy Available.
Milstead, J., et al., "Metadata: Cataloging by Any Other Name . . ." Jan. 1999, Online, Copyright © 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages. Best Copy Available.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.

(56) References Cited

OTHER PUBLICATIONS

Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., "Abductive Equivalential Translation and its application to Natural Language Database Interfacing," Sep. 1993 Dissertation paper, SRI International, 163 pages.
Rayner, M., et al., "Adapting the Core Language Engine to French and Spanish," May 10, 1996, Cornell University Library, 9 pages. http://arxiv.org/abs/cmp-lg/9605015.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.
Roddy, D., et al., "Communication and Collaboration in a Landscape of B2B eMarketplaces," VerticalNet Solutions, white paper, Jun. 15, 2000, 24 pages.
Rudnicky, A.I., et al., "Creating Natural Dialogs in the Carnegie Mellon Communicator System".
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH -Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.

(56) References Cited

OTHER PUBLICATIONS

Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Jouvet et al., "Evaluating Grapheme-to-Phoneme Converters in Automatic Speech Recognition Context", IEEE, 2012, pp. 4821-4824.
International Preliminary Report on Patentability received for PCT Patent Application No. PCT/US2013/044574, issued on Dec. 9, 2014, 8 pages.
International Search Report and Written Opinion received for PCT Patent Application No. PCT/US2013/044574, mailed on Sep. 27, 2013, 12 pages.
Viikki et al., "Speaker- and Language-Independent Speech Recognition in Mobile Communication Systems", IEEE, vol. 1, 2001, pp. 5-8.

\* cited by examiner

NAME RECOGNITION SYSTEM

BACKGROUND OF THE INVENTION

Embodiments of the present invention relate to the field of speech recognition. Speech recognition systems have been deployed for many years on various types of deices including desktop and laptop computer systems as well as telephone systems, such as cellular telephones and/or smartphones which include cellular telephones. One use of speech recognition systems in telephones, such as smart phones, is the use of name dialing which allows a user to speak a name in a contacts database in order to cause the telephone to initiate a telephone call. Speech recognition systems can use phonetic dictionaries or lexicons in order to recognize spoken words. Some speech recognition systems, particularly those which are adapted to provide natural language recognition, use a large phonetic dictionary to model a large set of words. These systems can be used to recognize names in an address book or contacts database, but these systems often have difficulty with names due to the fact that the names are often not modeled in a phonetic dictionary or the names are in a different locale from the locale used in the phonetic dictionary.

SUMMARY OF THE DESCRIPTION

A speech recognition system can, in one embodiment of the invention, use an extended phonetic (dictionary that is obtained by processing words in a user's set of databases, such as a user's contacts database or calendar or media database, etc., with a set of one or more pronunciation guessers. The speech recognition system can use a conventional phonetic dictionary and the extended phonetic dictionary to recognize speech inputs such as a speech input in which a user requests to use the contacts database, for example, to make a telephone call, etc. The extended phonetic dictionary can be updated in response to changes in the contacts database, and the set of pronunciation guessers can include pronunciation guessers for a plurality of locales, each locale having its own pronunciation guesser. In one embodiment, the extended phonetic dictionary can be updated at runtime based on changes to the user's databases, such as changes to the contacts databases, etc.

In one embodiment of the invention, a data processing system can perform a method which includes storing a phonetic dictionary for speech recognition; obtaining words from a user's set of one or more databases; processing, using a set of one or more pronunciation guessers, the words from the user's set of one or more databases, the processing producing additional phonetic data derived from the words, the additional phonetic data forming an extended phonetic dictionary for the user; receiving a speech input; and processing the speech input by comparing phonemes detected in the speech input to the phonetic dictionary and to the extended phonetic dictionary to determine a set of one or more matches, from which a best match can be determined. Phonetic fuzzy matching can be used to determine the best match. In one embodiment, the user's set of one or more databases can include a contacts database, which can also be referred to as an address book, which includes names of people and telephone numbers and email addresses, etc. In one embodiment, the phonetic dictionary can be for a natural language speech recognition system, and the speech input from the user can be a request to call a telephone number or to send a text message to another user's device or to play a song or movie on the user's device. The user's set of one or more databases can also include one or more calendar databases, and databases for medias, such as songs or movies or pictures, etc. In one embodiment, the method can also include obtaining changes in the contacts database and processing, using the set of one or more pronunciation guessers, the changes to update the extended phonetic dictionary based on the changes; the obtaining of the changes can occur in response to the changes being made or can occur in response to a speech input which causes the system to determine whether or not such changes exist and to thereby then process those changes using the set of one or more pronunciation guessers. In one embodiment, the set of one or more pronunciation guessers include pronunciation guessers for a plurality of locales, each locale having its own pronunciation guesser. For example, if the user's device has been set for a USA English locale, then the pronunciation guessers can include, in one embodiment, pronunciation guessers for American English, Spanish, and potentially other languages which are commonly used in the United States of America (USA). If the user's device has been set for a locale in Europe, then the set of pronunciation guessers for a set of locales can include pronunciation guessers for English, French, German, and Italian. In one embodiment, the set of pronunciation guessers can include different types of pronunciation guessers for the same locale in order to provide a more robust selection of pronunciation guesses. In one embodiment, a locale can be considered to be a language or a dialect of a language.

In one embodiment, the method can also include determining automatically a set of languages or locales from the words in the user's set of one or more databases. Automatic language detection systems and modules currently exist which can analyze words in a document or database and determine, from that analysis, the languages used. An example of such an automatic language identification system is provided in published U.S. Application US2009/0307584. A subset of the set of pronunciation guessers can be selected based upon the languages identified by an automatic language identifier system, and this selected subset can then be used to process words in the user's databases, such as contacts databases, calendar databases, media databases, etc., in order to generate an extended phonetic dictionary based upon a selected subset of locales which are derived from the analysis performed by the automatic language identifier. In one embodiment, the processing of a speech input can use only that subset of pronunciation identifiers which are selected as a result of the analysis performed by the automatic language identifier.

In one embodiment, the method can be performed by a server that is coupled through a wireless network to the user's device which includes the contacts database and other databases in the user's set of databases. The wireless network can be a local WiFi network or a cellular telephone network or a combination of such wireless networks. The server can obtain the words in the user's databases through the wireless network and can receive the speech input from the user's device through the wireless network, via a network interface (at the server) which is coupled to the wireless network. The server can transmit the best match as the result of the speech recognition operation to the user's device through the wireless network in this embodiment.

In another embodiment, all of the operations in a method according to an embodiment of the present invention can be performed on the user's device without the use of a server. In yet another embodiment, the user's device and the server can split the processing between the two devices and perform various parts of the methods described herein on each of the two devices.

The embodiments described herein can be implemented as machine readable non-transitory storage media or as methods or as one or more data processing systems.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both.

Although the processes are described below in terms of some sequential operations, it should be appreciated that some of the operations described may be performed in a different order. Moreover, some operations may be performed in parallel rather than sequentially.

Figure 1:
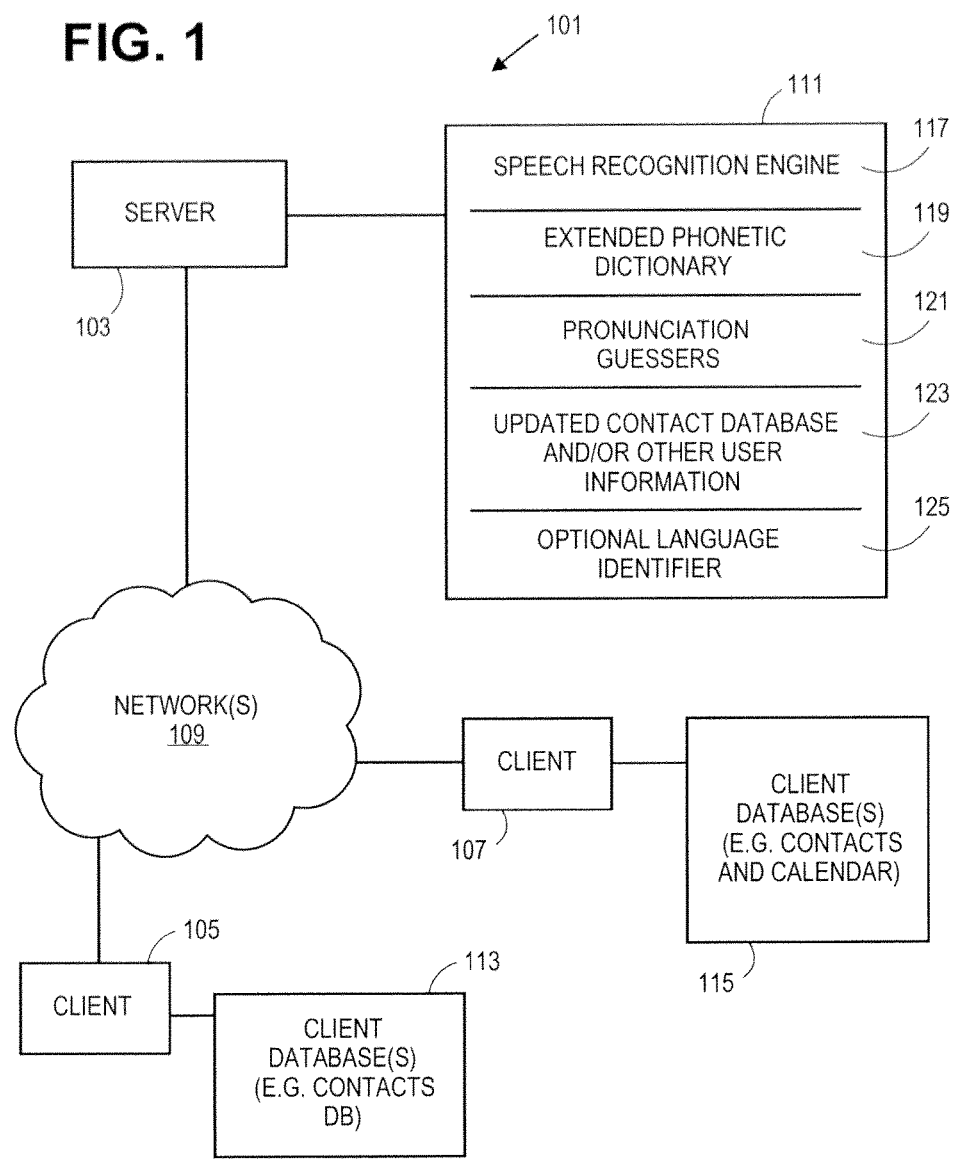
FIG. 1 shows an example of a system in which a server provides speech recognition services to a plurality of client devices according to one embodiment of the present invention.

FIG. 1 shows a client/server system in which a server system provides speech recognition services for one or more client devices, each of which can be a data processing system such as a smartphone or other cellular telephones. In the client/server system 101 shown in FIG. 1, at least two client devices 105 and 107 are shown coupled through one or more networks 109 to a server system 103. Server system 103 can be a general purpose computer system or a special purpose computer system or other types of data processing systems (such as the system shown in FIG. 9) which can be configured to provide speech recognition services; for example these systems can be configured by using software that programs the data processing system to perform the speech recognition services. This software can include a speech recognition engine 117 stored in a storage device 111. The speech recognition engine 117 can, in one embodiment, be a natural language speech recognition system that uses a conventional phonetic lexicon such as a phonetic dictionary as is known in the art. Storage device 111 also includes other components which can be used by the server system 103 and which will be described further below. In the system shown in FIG. 1, each of the clients, such as clients 105 and 107 can send a digitized speech input to the server system 103 which then processes the digitized speech input using the speech recognition system at the server system 103. Each of the clients, such as clients 105 and 107 can be a desktop computer system or a laptop computer system or a cellular telephone, or a smartphone, or other data processing systems or consumer electronic devices, including embedded electronic devices. These clients can include one or more databases for each of the clients. For example, client 105 can be a smartphone for a particular user that includes databases for that user such as a contacts or address book database and a calendar database, and media databases, and potentially other databases storing information for that particular user, which can be unique for that particular user relative to other users of other client systems.

In the example shown in FIG. 1, the client databases 113 can be stored on storage device, such as flash memory of client 105 and can be local storage only at client 105 system; in another embodiment, the client databases, such as client database 113 can be stored remotely on a server system which is accessible through a network. Similarly, client 107 includes client databases 115 which can be unique for the user of client system 107 and can include a contacts database and a calendar database and potentially other databases. Each of the client systems, such as client systems 105 and 107 can include a speech input hardware system such as one or more microphones designed to capture the user's speech input and then a system which processes and digitizes that speech input and then transmits that speech input through one or more networks 109 to the server system 103. In one embodiment, one or more of the client systems, such as client systems 105 or 107 or a server system such as server 103 may include a speech repair system, such as the system described in pending U.S. patent application Ser. No. 13/247,912, filed Sep. 28, 2011, and entitled "Speech Recognition Repair Using Contextual Information", and this application is hereby incorporated herein by reference.

Each of the clients in system 101 can be configured to transmit data representing the content of each of the client databases so that the server system 103 can process the words in the databases according to the methods described herein using the pronunciation guessers to generate one or more extended phonetic dictionaries according to the embodiments described herein.

The one or more networks 109 can be one or more cellular telephone networks or one or more local area wireless networks, such as one or more WiFi networks or a combination of such networks and can include both wired and wireless portions. The one or more networks 109 serve to provide a data connection to transmit data, such as words in the client databases, such as names and telephone numbers in the contacts databases of the various users using the client devices, and the one or more networks 105 can also provide, in one embodiment, voice telephony services allowing users to talk over their cellular telephones as well as provide text messaging services and other services known in the art in connection with cellular telephones or smartphones.

Storage device 111 is coupled to server system 103 either as part of the server system 103 (e.g., a local hard drive of server system 103) or as a storage device on a network which is coupled to server system 103. Server system 103 can be a set of servers in a server farm and storage device 111 can be a set of storage devices in a Storage Area Network (SAN). Storage device 111 can be one or more hard drives containing software and data to provide the speech recognition services described in conjunction with the one or more embodiments herein. Speech recognition engine, as noted above, can be a conventional speech recognition system which uses a conventional phonetic dictionary. In addition, the present invention provides an extension to that phonetic dictionary through one or more extended phonetic dictionaries 119. In one embodiment, each user which is provided speech recognition services by server system 103 can have their own dedicated extended phonetic dictionary 119 which is produced according to one or more methods described herein. The server system 103 can also include one or more pronunciation guessers 121 which are used to process words in the client databases retrieved from (e.g., dynamically uploaded from) client devices. As shown in FIG. 1, storage device 111 can include an updated contacts database and/or other user information for each of the users of client devices, such as client devices 105 and 107. In one embodiment, each client device can upload the latest version of contact databases and other databases from each client device or can upload just the last set of changes that were made since the last upload of the client database or changes to the client database. In one embodiment, each client device can upload a contacts database, a calendar database, a media database, and potentially other databases containing unique user information, and these databases are stored as, for example, updated contact database 123 in the storage device 111. In one embodiment, storage device 111 can also include one or more optional language identifier systems, such as optional language identifier 125 which can be a software module that performs automatic language identification, such as the automatic language identification described in published U.S. Patent Application US2009/0307584 which application is hereby incorporated herein by reference. The optional language identifier can analyze the words in the client's databases to determine the languages or locales used in the those databases and to thereby select the subset of pronunciation guessers which are appropriate for those locales and which match those locales; further aspects with respect to automatic language identification are described further below.

Figure 2:
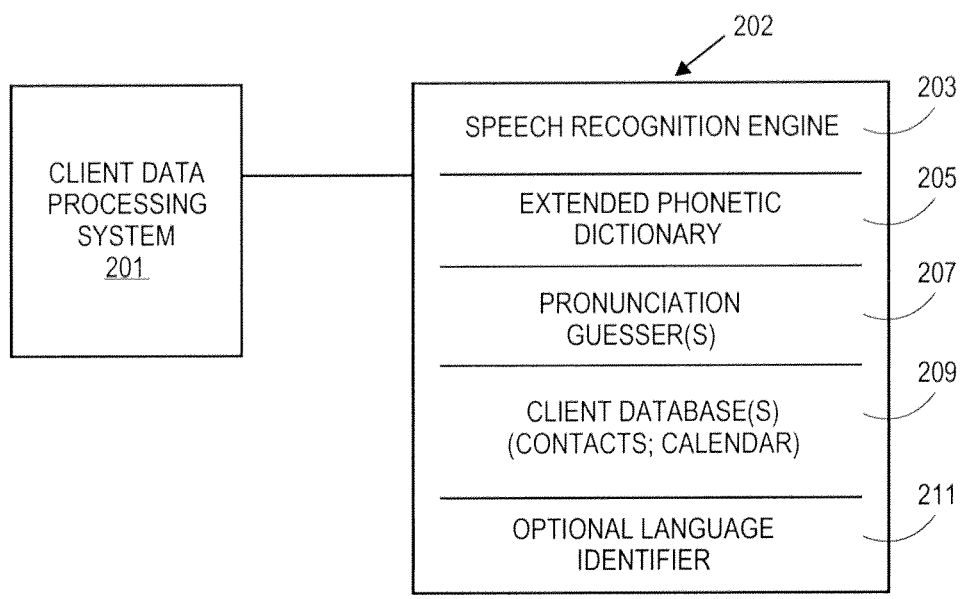
FIG. 2 shows an example of an embodiment of the invention in which a client data processing system implements all aspects or a portion of the aspects of one or more embodiments described herein.

While FIG. 1 shows an example of a client/server architecture in which a server performs at least a portion of the speech recognition services according to one embodiment, FIG. 2 represents an alternative embodiment in which a client device performs all those services without the need for a server system to perform speech recognition services. In this embodiment, a client data processing system such as the system 201 can have all the resources stored on a local storage device 201. These resources can include a speech recognition engine 203 which can be, in one embodiment, software and data designed to provide natural language speech recognition and can include a standard or conventional phonetic dictionary used in the process of providing natural language speech recognition. In addition, storage device 201 can include an extended phonetic dictionary 205 which is derived from one or more user databases 209, such as a contacts database or a calendar database or a media database or other databases specific to and unique to the user of the client system 201. The extended phonetic dictionary 205 can be derived by using one or more pronunciation guessers, such as pronunciation guessers 207 which process words in the one or more client databases 209 on the storage device 201. In one embodiment, the client databases can include a contacts or address book database or other data structures that include names, telephone numbers, addresses, email addresses, and other contact information and other pertinent information for one or more people or businesses for the user of the data processing system 201. In addition, other databases can include a calendar, database or a plurality of calendar databases, a media database, such as a song, movie, etc. database, and other user databases which may be the subject of speech input commands from the user of data processing system 201. Data storage 202 may also include an optional language identifier 211 which can be an automatic language identification module, such as the systems described in published U.S. Patent Application 2009/0307584.

It will be appreciated that the system shown in FIG. 1 or 2 can be employed with a variety of the different embodiments described herein, such as the embodiments described in conjunction with FIGS. 5, 6, 7, and 8 as well as other embodiments described herein. Moreover it will be appreciated that the processing operations in any one of the methods described herein may be split among a client and server architecture such that a client system can perform some of the operations while the server performs other of the operations in order to achieve a result of any one of the methods described herein.

Figure 3:
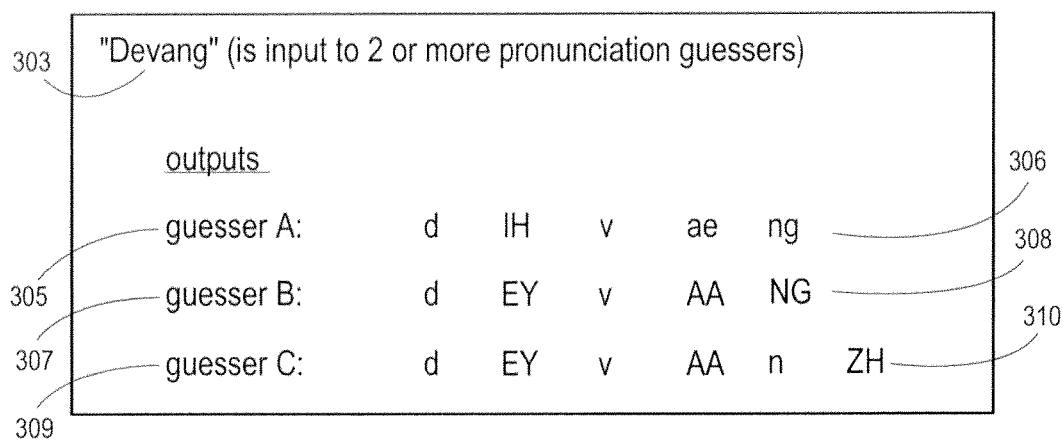
FIG. 3 provides an example of the use of two or more pronunciation guessers according to one embodiment of the present invention.
Figure 4:
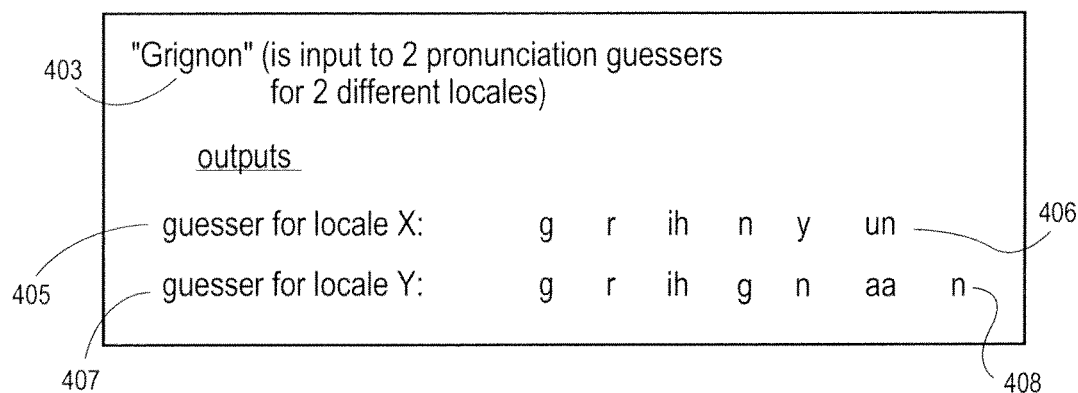
FIG. 4 provides an example of the use of two pronunciation guessers for two different locales according to another embodiment of the present invention.

FIGS. 3 and 4 show two examples of the use of a plurality of pronunciation guessers when words in a user's database, such as a contacts or address book database are being processed. In the example shown in FIG. 3, an input word "Devang" is used as an input to two or more pronunciation guessers. This input word 303 results in three different outputs from three different pronunciation guessers 305 and 307 and 309. In particular, outputs 306 and 308 and 310 result from the processing performed by three different pronunciation guessers, guessers 305 and 307 and 309 respectively, based upon the input. The three different pronunciation guessers can be pronunciation guessers that use different techniques in processing the inputs to derive an output. There are a plurality of known pronunciation guessers that can be used in various embodiments of the present invention. For example, one known pronunciation guesser uses a classification and regression tree to guess the pronunciation of words which in effect converts letters to sound rules. Another example of a known pronunciation guesser which can convert letters to sound rules is a pronunciation guesser which employs a maximum likelihood estimation technique. Yet another pronunciation guesser which can be used is a character language modeling pronunciation guesser which can also provide an output at a phoneme level based upon an input word. In the example shown in FIG. 3, each of the pronunciation guesser 305 and 307 and 309 may be for the same locale, such as an American English locale or a French locale or a European Spanish locale. In another embodiment, the example of FIG. 3 shows the use of pronunciation guessers for three different locales (for example, A=USA locale; B=Spanish locale; and C=French locale), and each of these pronunciation guessers can use the same technique (for example, maximum likelihood estimation) for their corresponding locale.

FIG. 4 shows another example which can be employed in various embodiments of the present invention in which an input word from a user's database, such as a contacts database, is processed using two different pronunciation guessers for two different locales. In this case, the same pronunciation guesser technique, such as a maximum likelihood estimation technique can be used for two different locales. This approach is advantageous when a user's device is likely to contain names or other words that are from different locales. For example, it is often the case in the United States that individual names in a user's contacts or address book can be Spanish names or Chinese names or certain other locales. In this case, it is advantageous that pronunciation guessers for different locales be employed to analyze the names and words in the user's databases in order to generate different outputs which can then be matched using known techniques, such as phonetic fuzzy matching techniques, in order to derive a best match from a set of possible matches, as will be explained further below. In this example shown in FIG. 4, an input word 403 is provided as an input to two pronunciation guessers for two different locales. For example, one locale can be for American English and another locale can be for American Spanish. Each guesser for each locale can then provide an output, such as the outputs 406 and 408 from the guessers 405 and 407 respectively as shown in FIG. 4 and these outputs can be mapped, as explained herein, to the target locale of the standard phonetic dictionary. These outputs can then be used as part of the extended phonetic dictionary for the user when speech recognition is performed. In one embodiment, these extended phonetic dictionaries can be embedded within a conventional or standard phonetic dictionary or can be maintained and processed separately from a standard or conventional phonetic dictionary. In either case, the use of the extended phonetic dictionary can improve the accuracy of speech recognition when the speech recognizer is attempting to recognize names in one or more locales in a user's set of databases, such as a contacts database. In one embodiment, a standard phonetic dictionary will be configured or designed to work in a particular locale which can be referred to as a target locale; for example, a user who lives in the USA and speaks American English would have a system that uses a standard phonetic dictionary that uses American English as the target locale. Further, pronunciation guessers for other locales that were used to create the extended phonetic dictionary may use a mapping from phonemes in the other locales to phonemes in the target locale, and this mapping can be done using an aligner or a set of manually setup rules that were prepared by a linguist who is familiar with the languages used in the target locale and one or more of the other locales. For example, if a Finnish pronunciation guesser is used to create outputs for the extended phonetic dictionary then a mapping from Finnish phonemes to phonemes in the target locale can be used to create the final output for the extended phonetic dictionary.

Figure 5:
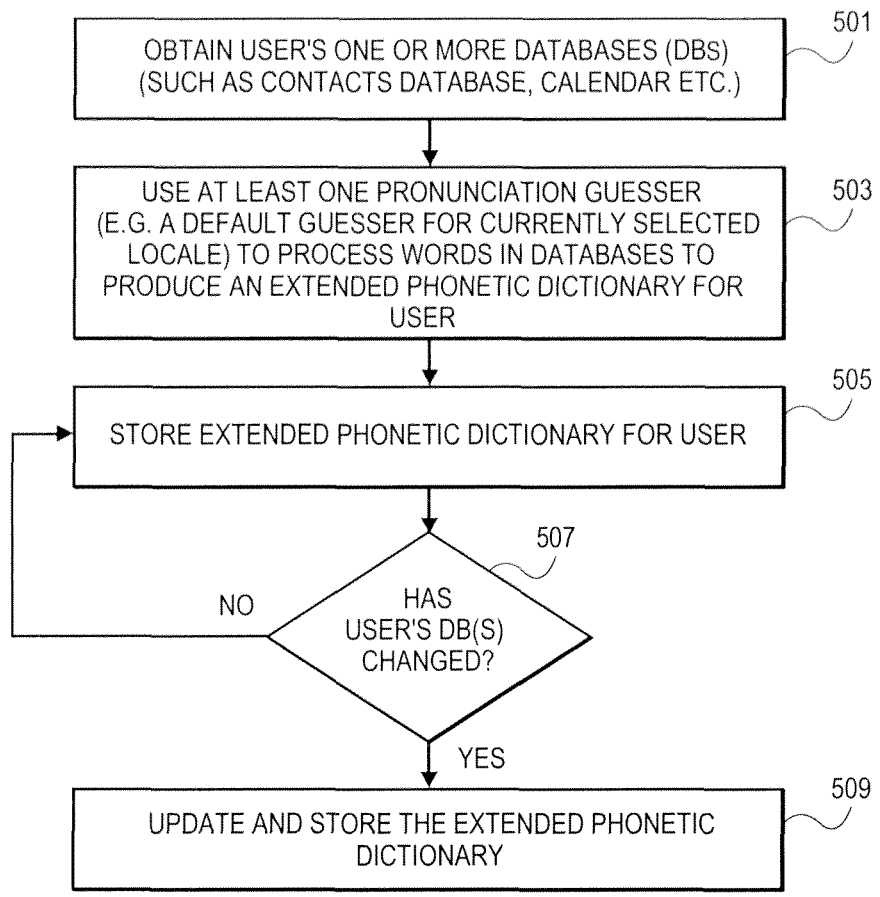
FIG. 5 is a flowchart which illustrates a method according to one embodiment of the present invention.
Figure 6:
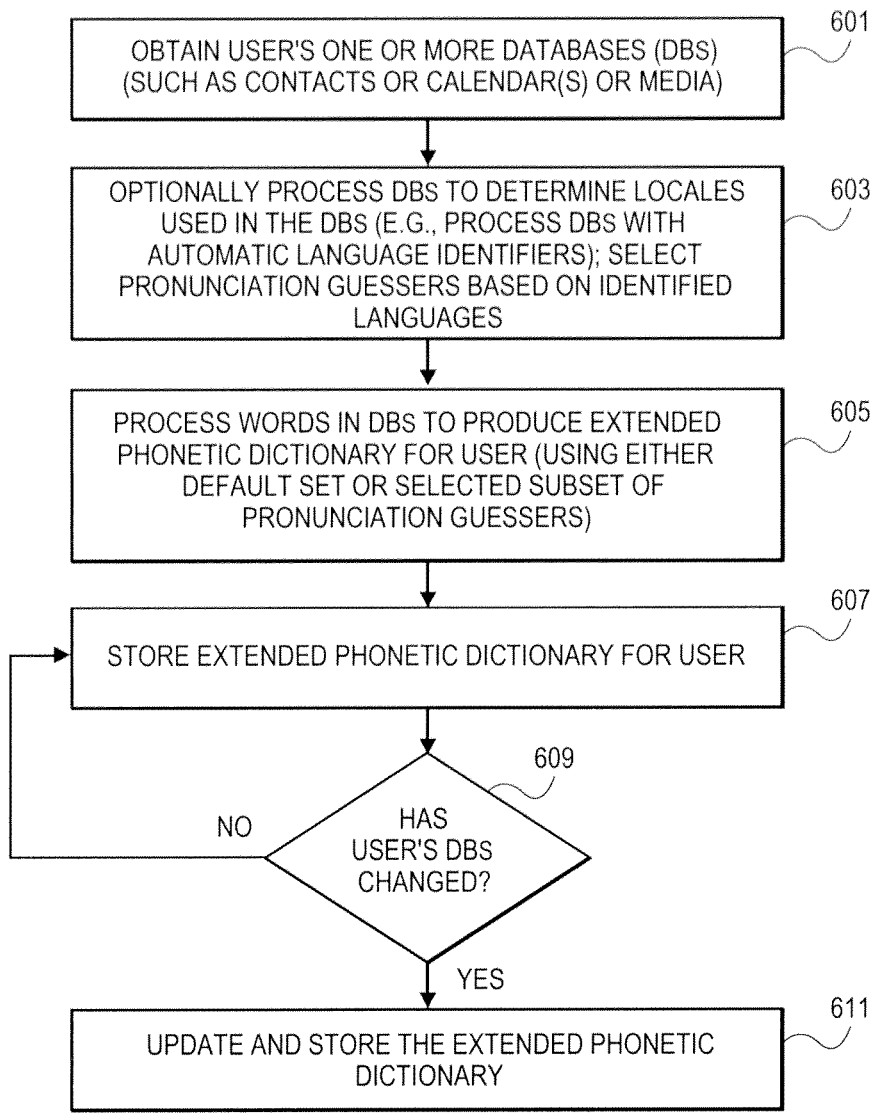
FIG. 6 is a flowchart which illustrates another method according to an embodiment of the present invention.

FIGS. 5 and 6 illustrate two exemplary methods for maintaining an extended phonetic dictionary even after the user makes one or more changes to the user's databases. For example, the methods shown in FIGS. 5 and 6 can maintain the extended phonetic dictionary while the user adds names to a contacts database or changes the names (for example when someone gets married) or deletes names from their contacts or address book. A method as in FIG. 5 can begin in operation 501 in which the data processing system obtains a user's one or more databases such as the user's contacts database and calendar database, and/or media database. These databases can be obtained by uploading the databases from the user's device through a network to a server, such as the server system 103 in the case of FIG. 1 or can be obtained by localing retrieving the databases from the user's data processing system as in the case of FIG. 2. It will be appreciated that the term "database" is meant to cover any data structure containing the user data such as contacts or address book data or calendar data or media data or other types of user data. These data structures can be a structured data structure in which data is entered into fields or can be an unstructured data structure as in, for example, a sequence or string of text. Then in operation 503, the data processing system can use at least one pronunciation guesser, such as a default guesser for the currently selected locale on the data processing system, to process words in databases to produce an extended phonetic dictionary for the user. FIG. 4 shows one such example in which a set of pronunciation guessers for different locales is used to process words in the user's databases. In the case of the architecture shown in FIG. 1, the server system 103 can perform operation 503 by processing words in the databases, after the databases have been retrieved through the uploading process. In the case of the architecture shown in FIG. 2, the client data processing system can perform operation 503 by using its local versions of one or more pronunciation guessers 207 to create a local extended phonetic dictionary 205 which is derived from the processing of the pronunciation guesser 207 on words in client database 209. After operation 503, the system can then store the extended phonetic dictionary for the user in operation 505; the storage of the extended phonetic dictionary can either be a local storage as in the case of the architecture shown in FIG. 2 or a remote storage, relative to the user's device, as in the case of the architecture shown in FIG. 1. After an initial or updated version of an extended phonetic dictionary has been stored, the system in operation 507 can determine whether or not the user's databases have changed. Operation 507 may be performed as a periodic or intermittent task (e.g. at every system start-up or wake from sleep) or may be performed in response to a notification from a daemon software component that a user's database has changed or can be performed in response to a speech input which can then determine whether or not the user's database has changed since the last time that the extended phonetic dictionary was updated. If no change has occurred then, the extended phonetic dictionary last created can be maintained in storage, but if a change has occurred in one of the user's databases, then operation 509 can be performed in which the extended phonetic dictionary is updated by performing operation 503 again and storing the result of the updated extended phonetic dictionary. Operation 509 can involve using at least one pronunciation guesser on the entire user's databases without regard the changes (if the prior extended phonetic dictionary is to be discarded) or can be performed on just the portions of the databases that have changed.

FIG. 6 shows an example of another method for creating and maintaining an extended phonetic dictionary for a user's one or more databases, such as contacts or calendars or media databases or a combination of such databases. In operation 601, a data processing system can obtain the user's one or more databases from either a local storage as in the case of the architecture shown in FIG. 2 or by receiving the databases when the client device uploads the one or more databases as in the architecture shown in FIG. 1. After the databases are obtained, operation 603 can optionally be performed in order to determine the locales that are used in the databases. This can be performed with the use of automatic language identifiers which are known in the art; see for example published U.S. Patent Application US2009/0307584. These automatic language identifiers can process the words in the user's one or more databases and determine the locales based on those words. The result of operation 603, if performed, can allow a system to select a subset of available pronunciation guessers based on the identified languages so that the system need only use that subset rather than all of the pronunciation guessers which are available to the system. For example, if the system has ten pronunciation guessers for ten different locales, and the language identifier determines that only three locales are used in the user's databases, then only those three pronunciation guessers can be used when processing the words in the user's database in order to create the extended phonetic dictionary. If operation 603 is not performed, then the system can use a default set of pronunciation guessers based upon a currently selected locale. For example, if the United States of America is the currently selected locale, then the default pronunciation guessers could be a pronunciation guesser for American English and American Spanish (i.e., Spanish spoken in the USA), and no other pronunciation guessers are used when processing the user's set of one or more databases to create the extended phonetic dictionary. In operation 605, the data processing system processes the words in the databases to produce the extended phonetic dictionary for the user, again using either a default set of pronunciation guessers or a selected subset of pronunciation guessers. It will be appreciated that in addition to using different pronunciation guessers for different locales, the system can also use different types of pronunciation guessers. As described herein there are at least three different types of pronunciation guessers which are currently available. After the words are processed in operation 605, the system can store the extended phonetic dictionary for the user in operation 607, and then operation 609, which resembles operation 507, can be performed. In response to determining in operation 609 that the user's database has changed, then, in operation 611, the extended phonetic dictionary is updated based upon those changes by either processing just the changes or by repeating the entire processing of the entire database and discarding the previously created extended phonetic dictionary.

Figure 7:
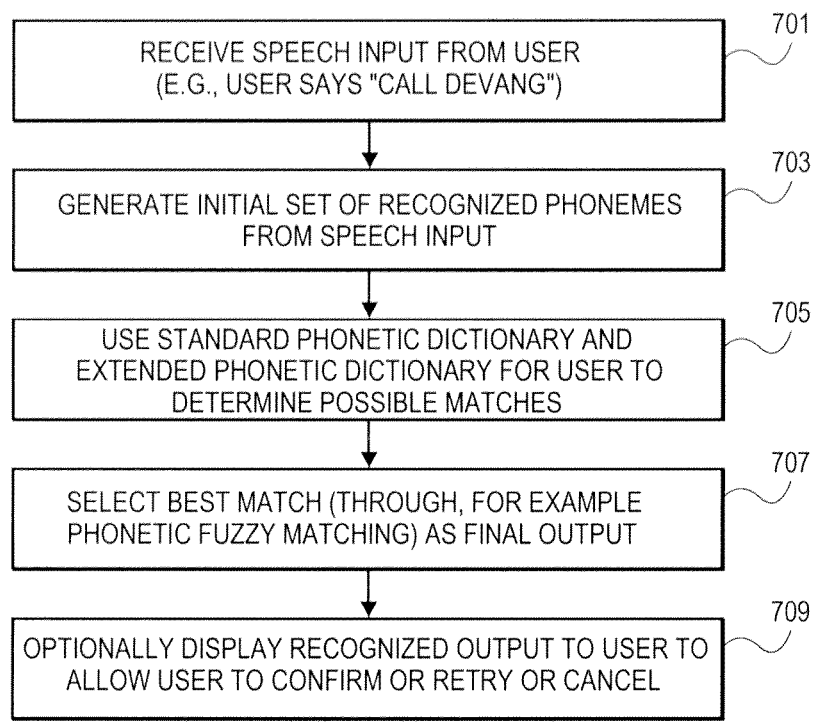
FIG. 7 is a flowchart which illustrates a method according to an embodiment of the present invention.
Figure 8:
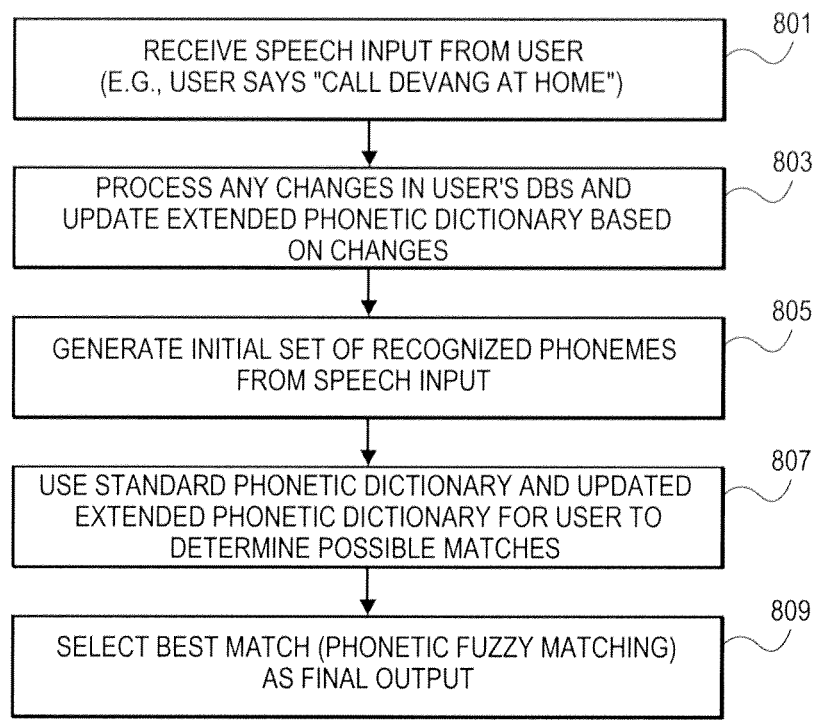
FIG. 8 is a flowchart which shows a method according to one embodiment of the present invention.

FIGS. 7 and 8 provide examples of methods in which the extended phonetic dictionary is used in conjunction with speech recognition. In one embodiment, the speech recognition system used in both FIGS. 7 and 8 can be a natural language speech recognition system which uses a large and conventional phonetic dictionary as part of the speech recognition engine, such as speech recognition engine 117 in FIG. 1 or 203 in FIG. 2. The method shown in FIG. 7 can begin in operation 701 in which a data processing system receives a speech input from the user; for example the user can say (by speaking into a microphone of a client device) "call Devang" and the client system can receive and digitize the speech input using known techniques and then process the speech input using a speech recognition engine such as the speech recognition engine 117 or the speech recognition engine 203. In the case of the use of speech recognition 203, the speech input is received and processed at the client data processing system 201, whereas in the embodiment shown in FIG. 1, the speech input is received and digitized and then transmitted through network 109 to the server system 103 which then processes the digitized speech input, after having received it through a network interface at the server system 103. The speech recognition engine can then generate in operation 703 an initial set of recognized phonemes from the speech input received in operation 701. Then the system can in operation 705 use the standard phonetic dictionary and the extended phonetic dictionary (which can be embedded in the standard phonetic dictionary) for the user to determine possible matches. In one embodiment, the determining of possible matches can use a technique to obtain a priori knowledge about where, in a recognized sequence of phonemes, names are expected to be and to use the extended phonetic dictionary on at least the portion of phonemes where names are expected to be. For example, as explained in the "Speech Recognition Repair Using Contextual Information" application (Ser. No. 13/247,912, filed Sep. 28, 2011) referred to herein, contextual information can be used to predict the location of a name between two recognized words "call" and "mobile" when the user says "call Devang mobile". In this case, the recognized words "call" and "mobile" can be used to determine that the phonemes between those recognized words are likely to be phonemes for a name; in other words, the system can use the context of the words "call" and "mobile" (as indicating a request to make a phone call to someone's mobile phone) to infer that the phonemes between those words are for a name and then use the extended phonetic dictionary, having multiple locales, on at least those phonemes. In operation 707, the system can then select the best match as a final recognized output; the selection of a best match can utilize phonetic fuzzy matching techniques which are known in the art. Then in operation 709 a client data processing system, such as client system 105 or 107 or 201 can optionally display the recognized output from operation 707 to the user to allow the user to confirm or to retry by speaking the input again or to cancel the operation requested by the user.

FIG. 8 shows another example of a method according to an embodiment of the invention in which speech is processed using an extended phonetic dictionary in combination with a standard phonetic dictionary. In operation 801, the speech input is received from the user; this input can be, for example, "call Devang at home". The words "call" and "at" and "home" can be recognized by the standard phonetic dictionary and the word "Devang" can be recognized by the extended phonetic dictionary. Operation 801 can be similar to operation 701 in which the speech input can be received at a client device and then transmitted through a network to a server system or can be received at the client device and processed at the client device as in the architecture shown in FIG. 2. In response to operation 801, the system can then in operation 803 process any changes in the user's databases and update the extended phonetic dictionary based on those changes. In the embodiment shown in FIG. 8, it is assumed that the data processing system will be fast enough to perform operation 803 after having received the speech input. Then in operation 805 the system generates an initial set of recognized phonemes from the received speech input.

In operation 807, these recognized phonemes are then processed using a standard phonetic dictionary and the updated extended phonetic dictionary for the user to determine possible matches. The best match can then be selected in operation 809 by using, for example, conventional phonetic fuzzy matching to derive the final output from the speech recognition system. As in the method shown in FIG. 7, the method of FIG. 8 can also include an optional operation in which the recognized output is displayed to the user to allow the user to confirm the operation requested in the speech input or to retry the speech input process again or to cancel operation.

Figure 9:
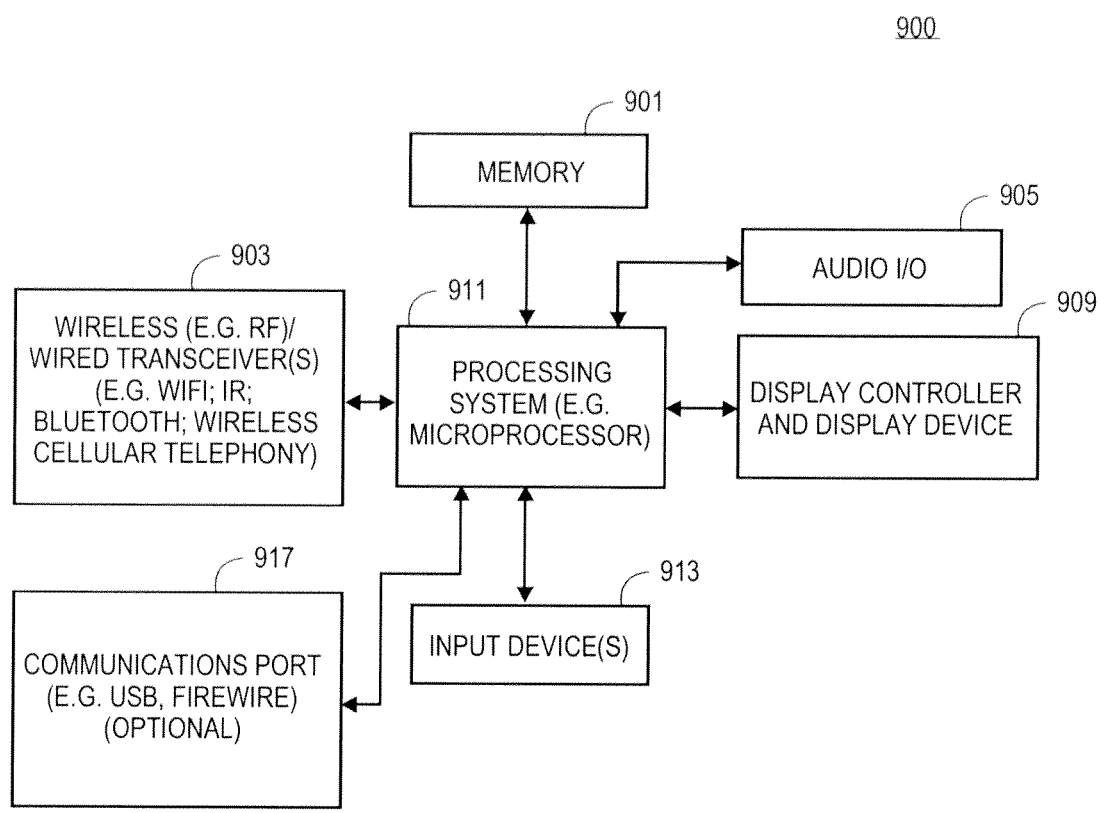
FIG. 9 is a block diagram of a data processing system which can be used to implement one or more embodiments of the present invention.

FIG. 9 shows an example of data processing system 900 which may be used with one or more embodiments of the present invention. For example and in one embodiment, system 900 may be implemented as a portable data processing device such as a smartphone or tablet (e.g., iPad) device or a laptop or an entertainment system and client systems 105, 107, and 201 can be implemented as shown in FIG. 9. The data processing system 900 shown in FIG. 9 includes a processing system 911, which may be one or more microprocessors or which may be a system on a chip (integrated circuit) and the system also includes memory 901 for storing data and programs for execution by the processing system. The memory 901 can store, for example, the software components described in conjunction with FIG. 1 or 2 and memory 901 can be any known form of a machine readable non-transitory storage medium, such as semiconductor memory (e.g., flash; DRAM; SRAM; etc.) The system 900 also includes an audio input/output subsystem 905 which may include a microphone and a speaker for, for example, playing back music or providing telephone functionality through the speaker and microphone. The microphone can receive the speech input described herein and that input can be digitized and provided to a speech recognizer system as described herein.

A display controller and display device 909 can provide a visual user interface for the user; this interface may include a graphical user interface which is similar to that shown on a Macintosh computer when running OS X operating system software or iOS software on an iPhone or iPad. The system 900 also includes one or more wireless transceivers 903 to communicate with another data processing system. A wireless transceiver may be a WLAN transceiver (e.g. WiFi), an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further can include one or more communications ports 917 to communicate with another data processing system. The communications port may be a USB port, Firewire port, Bluetooth interface, a docking port, etc.

The data processing system 900 also includes one or more input devices 913 which are provided to allow a user to provide input to the system. These input devices may be a keypad or a keyboard or a touch panel or a multi-touch panel which is overlaid and integrated with a display device such as display device 909. The data processing system 900 can also include an optional input/output device which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA-like functionality, or a handheld computer which includes a cellular telephone, or a media player, such as an iPod, or a game or entertainment device, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems which have fewer components or perhaps more components than that shown in FIG. 9.

Data processing system 900 can optionally include one or more hardware devices designed to digitize and store human speech received by the microphone in Audio I/O 905.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

Examples of a portable media player are described in published U.S. Pat. No. 7,345,671 and U.S. published patent application number 2004/0224638, both of which are incorporated herein by reference.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable non-transitory storage medium storing executable instructions which, when executed by a data processing system, cause the data processing system to perform a method comprising:
    storing a phonetic dictionary for speech recognition;
    obtaining words from a user's set of one or more databases;
    receiving a speech input from the user;
    responsive to the speech input, processing, using a plurality of pronunciation guessers, the words from the user's set of one or more databases, the processing producing additional phonetic data derived from the words, the additional phonetic data forming an extended phonetic dictionary unique to the user;
    processing the speech input by comparing phonemes detected in the speech input to the phonetic dictionary and to the extended phonetic dictionary to determine a set of one or more matches; and
    determining a best match from the set of one or more matches.

2. The medium as in claim 1 wherein the user's set of one or more databases comprises a contacts database with names of people and telephone numbers, and wherein the phonetic dictionary is for natural language speech recognition and wherein the speech input is for calling a telephone number or sending a text message to another user's device.

3. The medium as in claim 2, wherein the method further comprises:

obtaining changes in the contacts database and processing, using the plurality of pronunciation guessers, the changes to update the extended phonetic dictionary based on the changes, wherein the obtaining of the changes occurs in response to the changes being made.

4. The medium as in claim 3, wherein the plurality of pronunciation guessers comprise pronunciation guessers for a plurality of locales, each locale having its own pronunciation guesser.

5. The medium as in claim 4, wherein the method further comprises:
determining automatically a set of languages or locales from the words in the user's set of one or more databases;
selecting a subset of the plurality of pronunciation guessers, the subset selected based upon the set of languages or locales that were automatically determined from the words in the user's set of one or more databases; and
wherein the processing which produces the additional phonetic data uses only the subset of the plurality of pronunciation guessers when producing the additional phonetic data.

6. The medium as in claim 4 wherein the method is performed by a server that is coupled through a wireless network to the user's device which includes the contacts database and wherein the server obtains the words in the contacts database from the user's device through the wireless network and wherein the server receives the speech input from the user's device through the wireless network and wherein the server transmits the best match to the user's device through the wireless network.

7. The medium as in claim 6 wherein the server performs the method for a plurality of users, and each user in the plurality of users has a dedicated extended phonetic dictionary that is unique to each user.

8. The medium as in claim 3, wherein the plurality of pronunciation guessers comprises different pronunciation guessers for the same locale.

9. The medium as in claim 3 wherein the method is performed by the user's device which includes the contacts database.

10. A machine implemented method comprising:
storing a phonetic dictionary for speech recognition;
obtaining words from a user's set of one or more databases;
receiving a speech input from the user;
responsive to the speech input, processing, using a plurality of pronunciation guessers, the words from the user's set of one or more databases, the processing producing additional phonetic data derived from the words, the additional phonetic data forming an extended phonetic dictionary unique to the user;
processing the speech input by comparing phonemes detected in the speech input to the phonetic dictionary and to the extended phonetic dictionary to determine a set of one or more matches; and
determining a best match from the set of one or more matches.

11. The method as in claim 10 wherein the user's set of one or more databases comprises a contacts database with names of people and telephone numbers, and wherein the phonetic dictionary is for natural language speech recognition and wherein the speech input is for calling a telephone number or sending a text message to another user's device.

12. The method as in claim 11, wherein the method further comprises:
obtaining changes in the contacts database and processing, using the plurality of pronunciation guessers, the changes to update the extended phonetic dictionary based on the changes, wherein the obtaining of the changes occurs in response to the changes being made.

13. The method as in claim 12, wherein the plurality of pronunciation guessers comprise pronunciation guessers for a plurality of locales, each locale having its own pronunciation guesser.

14. The method as in claim 13, wherein the method further comprises:
determining automatically a set of languages or locales from the words in the user's set of one or more databases;
selecting a subset of the plurality of pronunciation guessers, the subset selected based upon the set of languages or locales that were automatically determined from the words in the user's set of one or more databases; and
wherein the processing which produces the additional phonetic data uses only the subset of the plurality of pronunciation guessers when producing the additional phonetic data.

15. The method as in claim 13 wherein the method is performed by a server that is coupled through a wireless network to the user's device which includes the contacts database and wherein the server obtains the words in the contacts database from the user's device through the wireless network and wherein the server receives the speech input from the user's device through the wireless network and wherein the server transmits the best match to the user's device through the wireless network.

16. The method as in claim 12, wherein the plurality of pronunciation guessers comprises different pronunciation guessers for the same locale.

17. The method as in claim 12 wherein the method is performed by the user's device which includes the contacts database.

18. A data processing system comprising:
an input device for receiving a speech input from a user;
a set of one or more processors coupled to the input device; and
a memory coupled to the set of one or more processors, the memory storing a phonetic dictionary for speech recognition and storing an extended phonetic dictionary unique to the user,
wherein the extended phonetic dictionary is produced by:
responsive to the speech input, processing, using the set of one or more processors, words in a user's set of one or more databases using a plurality of pronunciation guessers,
wherein the set of one or more processors processes the speech input by comparing phonemes detected in the speech input to the phonetic dictionary and to the extended phonetic dictionary to determine a best match.

19. The system as in claim 18 wherein the system is a server that is coupled through a wireless network to a user's device which stores the set of one or more databases which include a contacts database, and wherein the input device is a network interface that is coupled to the wireless network and wherein the server transmits the best match to the user's device through the wireless network, and wherein the speech input is for calling a telephone number in the contacts database or for sending a message to another user in the contacts database.

20. The system as in claim 18 wherein the user's set of one or more databases includes a contacts database and changes in the contacts database are processed using the plurality of pronunciation guessers to update the extended phonetic dictionary based on the changes, and wherein the plurality of pronunciation guessers comprise pronunciation guessers for a plurality of locales, each locale having its own pronunciation guesser.

* * * * *